United States Patent [19]
Beckham

[11] Patent Number: 5,367,822
[45] Date of Patent: Nov. 29, 1994

[54] TREE EDGING BORDER

[76] Inventor: James Beckham, Rte. 3, Box 240-AA, Florence, Miss. 39073

[21] Appl. No.: 16,743

[22] Filed: Feb. 11, 1993

[51] Int. Cl.$^5$ .......................... A01G 17/00; A01G 7/00
[52] U.S. Cl. ........................................................ 47/25
[58] Field of Search ............... 47/25, 24, 24 T, 24 RS, 47/30 OT

[56] References Cited

U.S. PATENT DOCUMENTS

| | | | |
|---|---|---|---|
| 1,108,764 | 8/1914 | Kull | 47/24 |
| 2,858,736 | 11/1958 | Hendrix | 47/25 |
| 2,978,837 | 4/1961 | Daniels | 47/25 R |
| 4,584,789 | 4/1986 | Jean | 47/25 R |
| 4,637,164 | 1/1987 | Brown | 47/24 |
| 4,934,093 | 6/1990 | Yanna | 47/25 |

FOREIGN PATENT DOCUMENTS

| | | | |
|---|---|---|---|
| 108967 | 11/1939 | Australia | 47/24 |
| 3715632 | 10/1987 | German Dem. Rep. | 47/23 |
| 2942527 | 4/1981 | Germany | 47/25 |

*Primary Examiner*—Henry E. Raduazo
*Attorney, Agent, or Firm*—Alexander F. Norcross

[57] ABSTRACT

An extruded plastic structure for edging a plant (tree, shrub or other planting) in a lawn. The strip has a border section, which slopes upward slightly to attach to a vertical ridge, usually in the form of an inverted rectangular section. A porous foam center permits watering of the root structure of the tree The edging is constructed as two symmetrical half circular sections which may be snapped together around the tree.

1 Claim, 2 Drawing Sheets

TREE EDGING BORDER

BACKGROUND OF THE INVENTION

This invention pertains to the field of grass and lawn edging and borders, and similar structures for controlling the growth of ground cover plants at lawn edges or around decorative plants such as bushes or trees.

U.S. Pat. No. 4,969,289 to Trifiletti discloses an edging material having a skirt extending out from a rectangular upright section. FIG. 2 shows in cross section the construction of this item. The article requires stakes to secure it. FIG. 6 shows a circular form of the article.

U.S. Pat. No. 3,724,128 to Tabone shows an extruded edging, of plastic, for use as a planter as around a tree. The patent shows a vertical, soil dividing section.

U.S. Pat. No. 4,858,378 to Helmy shows a modular planter which includes a cover extending to and surrounding the trunk of a plant. A circular version is shown.

U.S. Pat. No. 4,934,093 to Yanna shows a circular collar having both an inner and an outer border with a raised edge. This patent discloses that such edging will limit plant growth beneath the edging, and is thus useful for forming borders.

U.S. Pat. No. 3,777,421 to Bomba et al describes a two part lawn border; a flat base member is laid to form the border, and a cap member is snapped to the base to complete the border. This patent describes the use of an outwardly extending edge for supporting a lawn mower wheel so as to provide clean lawn edging. A two pan structure is stated to be necessary to avoid ground movement with frost.

U.S. Pat. No. 4,976,063 to Young discloses a lawn edging system for bordering a plant composed of interlocked curved and straight segments.

U.S. Pat. No. 2,654,180 to Redfield claims a lawn edger formed of a border material embedded in the ground at a lawn edge.

U.S. Pat. No. 2,782,561 to Smith discloses a tree surrounding ring.

SUMMARY OF THE INVENTION

An extruded plastic structure for edging a plant (tree, shrub or other planting) in a lawn. The strip has a border section, which slopes upward slightly to attach to a vertical ridge, usually in the form of an inverted rectangular section. A porous foam center permits watering of the root structure of the tree The edging is constructed as two symmetrical half circular sections which may be snapped together around the tree.

The border section extends over grass and other ground growth in the vicinity of the tree; grass and other ground cover will not grow through the border. Mowing is controlled by the vertical ridge which guides mower wheels so that the growing grass is trimmed. The border extends outwardly so that the growing section of grass is within the cutting zone of the mower blade and the grass is therefore trimmed. The offset of the border promotes drainage as well as permitting the edging strip to be pressed into the ground.

The center of the tree border structure is a porous foam ring, which suppresses growth of ground cover and weeds next to the trunk of the tree, but permits free flow of rain water to the tree's roots.

The preferred form of the invention is a circular disk, with a hollow center for the tree trunk. The apparatus is therefore formed as two symmetric half circular sections with a snap together edge along the straight diametric edge of each section.

DETAILED DESCRIPTION OF THE INVENTION

Figure 1:
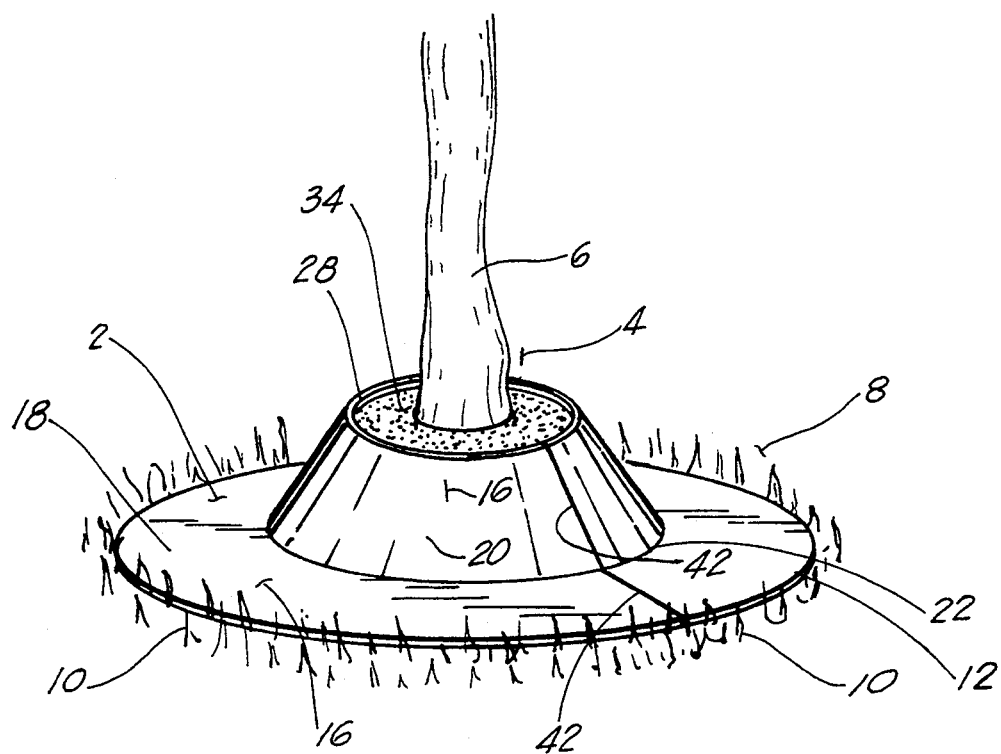
FIG. 1 shows the invention placed around the base of a tree.
Figure 2:
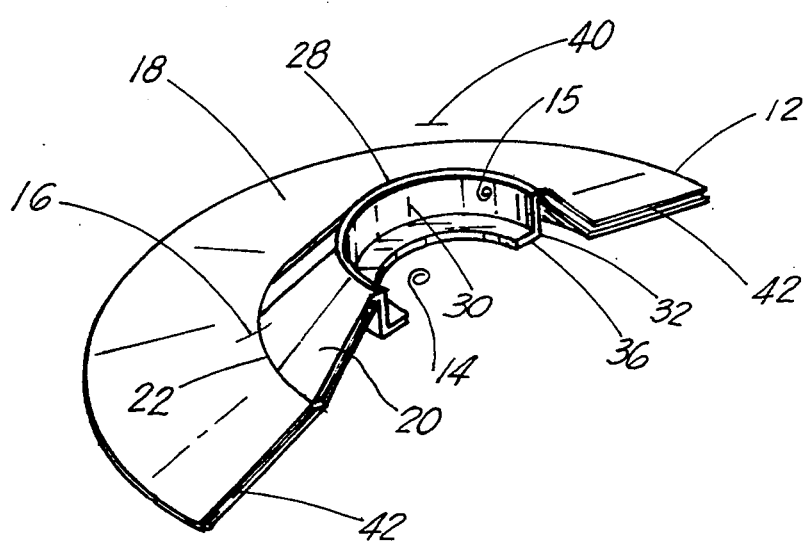
FIG. 2 shows a half circular section of the invention.
Figure 3:
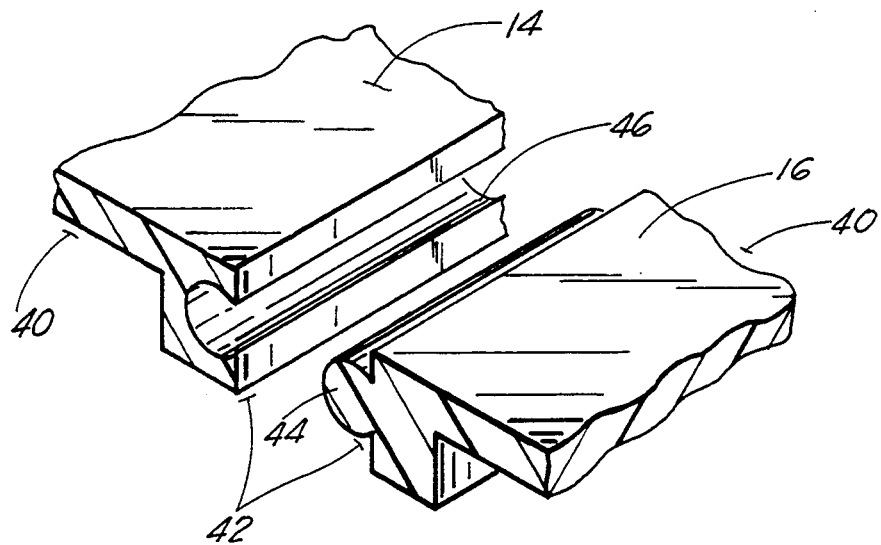
FIG. 3 shows the groove and ridge for engaging the half circular sections of the invention.
Figure 4:
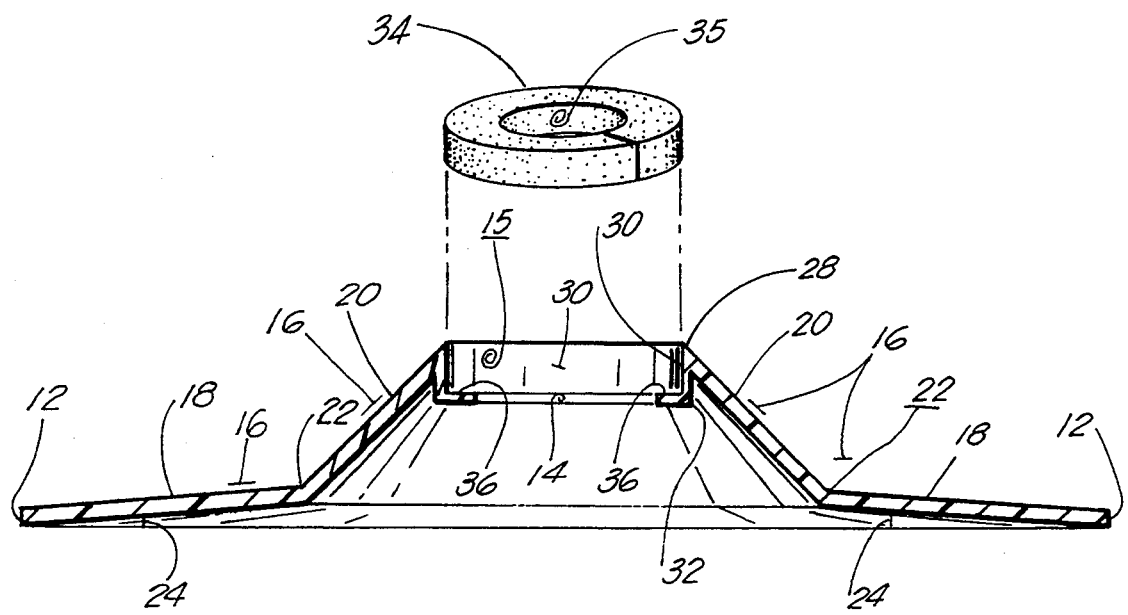
FIG. 4 is a cut section view through the assembled tree edging border.

The border 2 is shown as a circular structure to surround the base 4; covering the roots, of a decorative shrub or tree 6 in a lawn 8. By lawn, I include any garden or cultivated growth where a ground cover, such as grass 10, is grown and requires cutting to provide an attractive appearance. In such a cultivated environment, the presence of trees 6 or decorative bushes poses problems to the gardener. It is desirable to have the tree base 4 area free of the ground cover 10, and to be able to mow or trim the ground cover 10 up to the tree base 4 area free of growth. It is aesthetically pleasing to have a well defined visual border between the ground cover 10 and the tree base 4.

Since maintenance of the ground cover 10 requires mowing of the cover, it is also desirable that the cutting mechanism of a mower be able to traverse all areas of ground cover growth; equally the mower wheels and body, which extend beyond the cutting mechanism, should not hit or rub against the bush or tree 6 trunk, to prevent injury to the tree 6.

Finally the area around the base 4 of the tree trunk or over the tree roots, while it should be bordered, and made available to mowing, should be impermeable to growth, so that the ground cover will not grow on or through it. Yet the area around the base 4 of the tree, since it is over the root ball, must permit free passage of water and fertilizer to the tree root ball.

The invention 2 is a symmetrical circular structure which surrounds the base 4 of a tree or bush 6 and provides for all such needs. In structure the invention is circular, having an outer rim 12 defining its outer edge and an inner hole 14 through which passes the trunk of a tree 6. The wall 16 of the invention is constructed of an impermeable plastic, preferably about at least one-eighth inch thick. No ground cover 10 can grow through such plastic, and it will not support attachment and growth of creeping ground covers.

This invention 2 is built in the form of two joined concentric rings: an outer skirt 18, and an inner ridge 20 which is attached to the inner edge 22 of the skirt. Seen in side view, the outer skirt 18 forms a rising ledge, rising at an acute angle 24 from the outer rim 12, which is in contact with or buried slightly into the ground 8, up to the inner ridge 22. The preferred angle 24 of rise of the skirt 18 is six degrees, which provides an adequate cup effect around the base 4 of the tree. This inverted cup effect causes the inventive border 2 to rise from its outer rim 12 towards its center 14, forming a dome above the root section of the tree 6, and helping prevent any deleterious compacting of the ground over the root ball during cultivation and mowing of the lawn 10.

The inner ridge 20 forms a significant vertical wall, which rises from the inner edge 22 of the skirt 18. In the preferred embodiment, this ridge 20 consists of a steeply angled, vertical wall rising from the inner edge 22 of the skirt to an upper end 28 which extends a distance inwardly and then descends as an inner, descending vertical wall 30. This descending inner wall 30 descends to a point 32 above the level of the outer rim 12, it forms a cup shape in the center of the inventive border 2. The inner wall 30 defines an open space 15, the size of which should be a significant fraction of the size of the root area of the tree. This open space 15 is filled a porous material 34, which may be bark or other mulching material. In the preferred embodiment porous material 34 is a punctured disk 34 of porous foam, having an opening 35 just sufficient to pass the trunk of the tree 6. This foam disk 34 is split for ease of installation around the tree 6. A lip 36 extends inwardly from the inner wall 30 to provide support for the porous disk 34.

The structure is preferably constructed as two symmetrical half circular sections 40 so that the circular border 2 may be assembled by fastening together two such sections 40 around an existing bush or tree 6. Preferable the two sections 40 are provide with snap together diametric edges 42, for ease of assembly. Since the border 2 may easily be constructed of injection molded plastic, such a snap together edge 42 may consist of a mating tongue 44 and groove 46, comprising a groove 46 on the diametric edge 42 of one section 40 and a mating ridge or tongue 44 on the diametric edge 42 of a second section 40. Other such snap together means will be apparent to those skilled in the art of plastic parts assembly.

When two sections 40 are so snapped together around the base 4 of a tree, the resulting border 2 forms a distinctive border separating the ground cover 10 or grass from the base 4 of the tree. The border 2 may be made of a colored or tinted plastic for appearance enhancement. The skirt 18 is nearly flat, permitting a lawn mower to ride up on it to trim all the ground cover 10; the ridge 20 prevents the lawn mower from hitting the tree trunk, and thus protects the bush or tree 6 from harm during normal lawn cultivation activities.

The rising angle of the skirt 18 towards the center of the border 2 produces a beneficial inverted cup shape to the border 2. On the skirt 18, this causes dirt and dust to wash off the skirt 18, thus preventing the gradual encroachment of ground 8 and growth 10 onto the border 2, which would ultimately defeat the purpose of the border 2. Under the border 2, the soil may be mounded at a raised level which permits enhanced growth of the tree's roots, which is desirable for tree growth.

The central porous disk 24 prevents growth of weeds and ground cover, but is porous and therefore permits water and nutrients to reach the tree roots. Since all water and plant food which is placed in the central opening feeds only the tree 6, precise watering and feeding of the plant is possible, further enhancing the growth of the plant.

It can thus be seen that the invention is of a border for trees and bushes in a lawn environment, which enhances visual appearance by providing for a lawn edging border around the tree; which aids in the continued cultivation and mowing of the ground cove, while lessening the danger of damage to the tree from such activities, and which beneficial advantages in the care and cultivation of the tree both in protecting space for the root ball to grow and in promotion of proper watering and feeding of the tree.

While a tree has been used as the example plant in illustrating this invention, it is apparent to gardeners that the inventive border may be used for any decorative plant, with equally beneficial results. The invention as claimed is therefore not restricted to trees and grass, but to any decorative plant grown with adjacent ground cover.

I claim:

1. A border for decorative plants in a lawn comprising:
    a closed growth impermeable circular structure surrounding the trunk of a plant, in contact with a lawn, having, in cross section, an outer skirt, sloping slightly up from the lawn from an outer rim to an inner vertically arising mower wheel deflecting ridge section.
    said ridge section being a circular ring about said trunk spaced a distance from said trunk forming an inverted cup about said trunk;
    a porous inner water passing material said cup extending from said ridge section to said trunk;
    said distance being sufficient for free passage of water and fertilizer to a root ball of said plant;
    said porous inner material comprising a plant root impermeable disk of plastic foam filling said spaced distance.

* * * * *